June 19, 1962 J. ROSANES 3,039,414
METHOD OF PRODUCING HOLLOW FOUR-SIDED TAPERING
BEAMS OR COLUMNS FROM SHEET METAL
Filed March 9, 1961 2 Sheets-Sheet 1
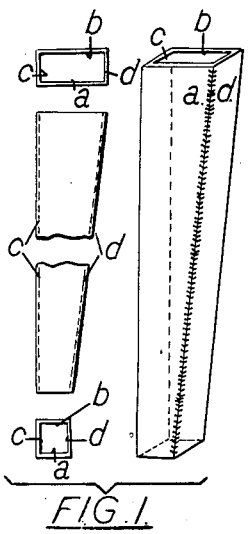
FIG. 1.
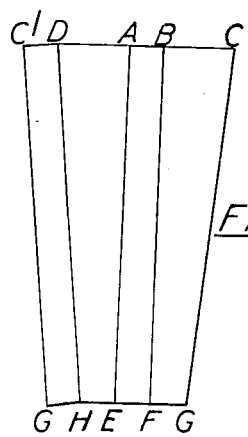
FIG. 2.
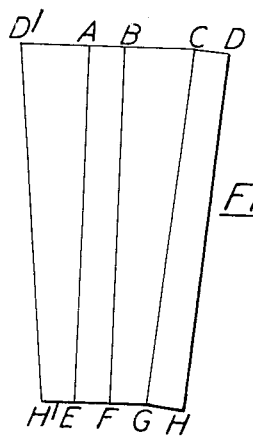
FIG. 3.
FIG. 4.
FIG. 5.
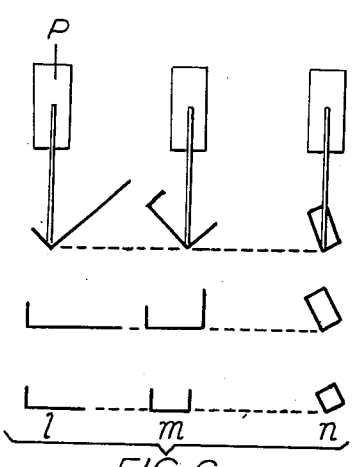
FIG. 6.
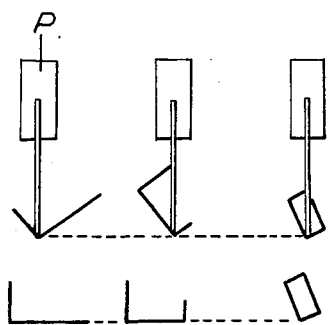
FIG. 7.
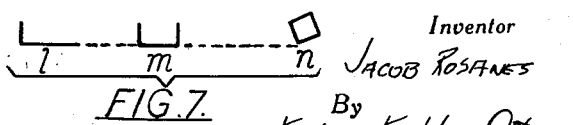
Inventor
JACOB ROSANES
By Kuchtein, Kuchden Otiger
Attorneys June 19, 1962 J. ROSANES 3,039,414
METHOD OF PRODUCING HOLLOW FOUR-SIDED TAPERING
BEAMS OR COLUMNS FROM SHEET METAL
Filed March 9, 1961 2 Sheets-Sheet 2
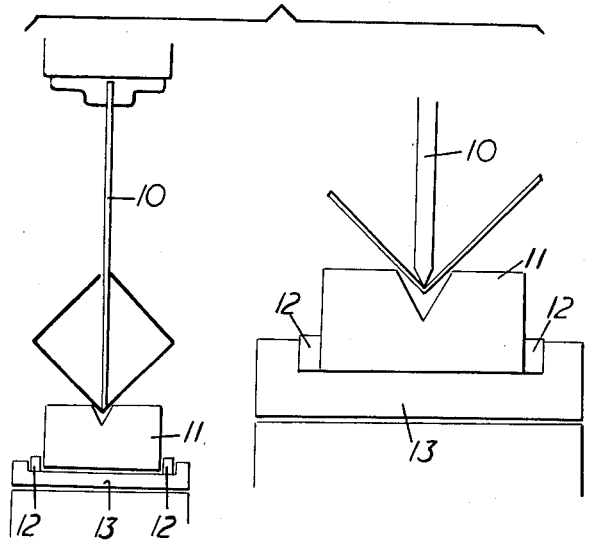
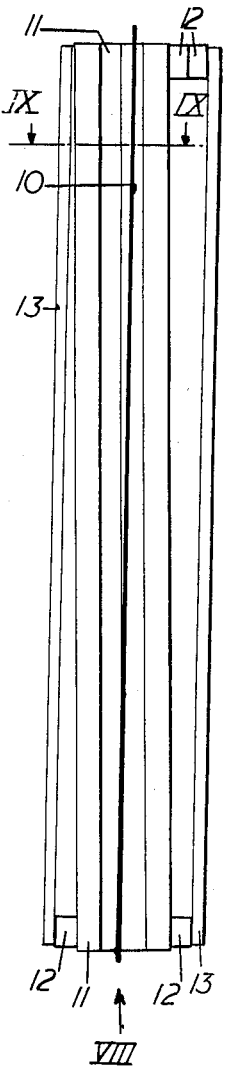
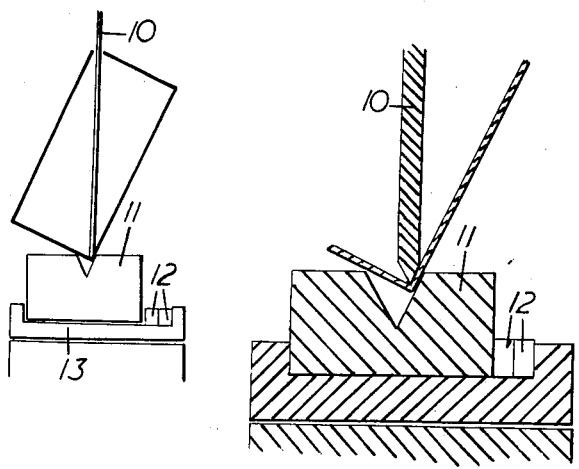
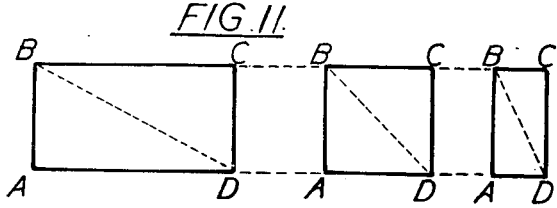
Inventor
JACOB ROSANES
By
Attorneys

United States Patent Office 3,039,414
Patented June 19, 1962

3,039,414
METHOD OF PRODUCING HOLLOW FOUR-SIDED TAPERING BEAMS OR COLUMNS FROM SHEET METAL
Jacob Rosanes, 31 Harakafot St., Kiryat Tivon, Israel
Filed Mar. 9, 1961, Ser. No. 94,580
Claims priority, application Israel May 31, 1960
7 Claims. (Cl. 113—116)

In building constructions there frequently arises the need for steel sections for the erection of steel frameworks. Thus rolled sections of T, U, H-section and the like more are used. Sometimes box shaped, elongated elements, for use as columns and girders are required. In such cases usually two appropriate sections are lengthwise connected by welding.

There are also generally known square or rectangular profiled light tubular elements made of sheet metal, which are used for gutters, rainpipes and the like purposes. These latter elements are made from sheet metal by bending processes and joining two extreme, longitudinal edges by soldering or otherwise, thereby closing a longitudinal joint coming into existence after the bending.

Square and rectangular tubing is also available commercially in different wall thicknesses and cross sectional areas, which is usually manufactured by rolling operations, and in the case of certain materials by extrusion.

Where special dimensions and wall thicknesses are required of such tubing, e.g., for structural purposes, these are obtained by welding together two appropriate standard sections, e.g. two angles or two channels, or two angles or channels previously bent from sheet metal are so united. These operations are sometimes inconvenient, since they comprise shearing and bending operations and at least two seam welding operations.

Rolled or drawn square or rectangular tubings are only made with uniform cross sections along their whole length and cannot be produced in tapering shape, i.e. with continuously varying cross section, changing the profile along the length of the tube from square to an elongated rectangle and/or vice versa.

Tapering tubes with varying cross-sections from rectangle to square or vice versa are fabricated from two angles or two channels by appropriate shearing of their shanks and welding them together by means of two welding seams on both their lengths.

The shape and size of a structural element is determined by the stresses to which it is to be subjected, the smallest cross sectional area being present where the stress is lowest and increasing in dimensions as stresses increase. Normal structural shapes are produced uniformly without any possibilities of making the elements tapering to meet varying stresses. However, they can be modified after production by additional fabrication and tapered for proper distribution of such stresses if required.

The rectangular tube as a structural element as such is considered an advantageous shape in comparison to other structural shapes when horizontal and vertical stresses, as applied normally in steel structures, are to be taken into consideration. When such tubes are manufactured by the conventional rolling, extruding or drawing, etc., methods, they are always of uniform cross sections and cannot be economically modified for tapering by additional fabrication. Furthermore the process of fabricating tapering tubes by welding appropriately sheared two channels or two angles (or any other combination thereof) is not economical either, and therefore has not been put to wider use.

In practice, in this latter technique two angles were prepared by bending from sufficiently strong sheet metal and were then welded together. Of course, angles were appropriately cut, each flange being (or at least one flange of each angle) of elongated trapezoidal shape. The bending of such an angle is conventionally performed in presses using a set of dies, the lower part of which has a V-groove, while the upper part is an elongated knife-like member, the edge of which enters the V-groove.

It is an object of the invention to provide a method of producing hollow quadrangular box-type tapering beams of varying cross sections from sheet metal which, when used as structural elements, such as columns, beams, girders, purlins, etc., fulfill all the requirements for the erection of metal frame buildings such as factories, warehouses, railway- or bus-terminals or others. It is a further object of the invention to provide a method whereby beams can be produced in various dimensions of height, width, wall-thickness, length, and extent of tapering according to the statical performance required from the structural element and are at equal strength, or less weight and cheaper to produce than rolled sections or special fabricated beams.

According to my invention the new method comprises the production of such hollow box-type quadrangular tapering beams from one single appropriately sheared metal-sheet or -plate by means of three bending strokes and one welding operation, by providing an elongated blank of—preferably—steel sheet of the required thickness, marking thereon, if necessary, the longitudinal edges of the tapering beam to be produced, cutting the longitudinal edges of the blank along the two opposite extreme markings, if necessary; bending the blank successively along the remaining markings until the extreme longitudinal edges of the blank abut against each other, and finally connecting said extreme by welding, which extreme edges coincide with the fourth longitudinal edge of the beams.

The bending in my new method is performed by means of a set of dies of the type referred to above, but in the third bending operating the relative position of the upper, and the lower die is so adjusted that the edge of the knife member and the line representing the peak of the V in the V-groove define between them a very small angle. In practice, the female or V-die will be placed in such a position on the die holder of the press that the said relative position of the two dies parts is attached. However, it would also be within the scope of the invention to adjust the knife member by angularly displacing it in relation to the V-member, this being done by adjusting the upper knife member holder attached to the ram of the press.

In a preferred embodiment the finished, tapering beam will be of a rectangular cross-section, the short sides of the cross-section remaining of equal length throughout the length of the beam, the longer sides of the cross-sectional rectangle becoming shorter towards one end of the beam. Two opposite sides of the beam will thus be tapering, i.e. trapezoidal, the two others remaining rectangular, so that the said rectangular cross-section will, at the end of the beam, be possibly, or approximately a square.

The new method will be described in detail with reference to the drawings, showing in—

FIGURE 1 the new box-type tapering beam in different views,

FIGURES 2 and 3 show two blanks, differently marked,

FIGURES 4 and 5 show two different cross-sections of bent blanks, ready to be welded, FIGURES 6 and 7 show, diagrammatically, various stages of bending of the marked steel blanks, FIGURES 8 and 9 illustrate the position of the V die for the third bending operation as seen at the ends with the square and the rectangular cross-sections respectively. (FIGURE 8 is a view in the direction VIII in FIGURE 10, while FIGURE 9 is a section on line IX—IX of FIGURE 10). Both, in FIGURE 8 and FIGURE 9 the V-die is seen in whole on the left hand side and on a larger scale, in fraction on the right hand side, FIGURE 10 is a top view of the die during the third bending operation, FIGURE 11 illustrates schematically the portion of the bending knife member and the variations of the angles between it and the front position of the walls of the beam.

FIGURE 1 shows on the right hand side the new beam or column in a perspective view the welded edge in front. It can be seen, that the two side faces $a$, $b$, are tapering downwardly, while the side faces $c$, $d$, are rectangles. Furthermore in the example shown the three sides $a$, $b$, $c$, are perpendicular to the end faces of the column; i.e. they are vertical, while only one side $d$ is inclined. The cross-section of the top of the column is rectangular, at the bottom it is a square. FIGURES 2 and 3 show two blanks, already marked and the other edges trimmed to the respective markings, thus being developments of the final beam. They are mirror-images of each other, but will be identical, columns, when bent and welded.

The bending of the blank of FIGURE 2 proceeds as shown in FIGURE 6.

In a suitable bending press P the blank is bent at right angles along line DH of FIGURE 2.

The FIGURE 6$l$ shows the blank in cross-section under the tool of the press and below, removed from the press, its top- and bottom-ends, respectively. FIGURE 6$m$ shows the blank bent along the line BF of FIGURE 2, and in FIGURE 6$n$ undergoing the third bend on line AE of FIGURE 2, whereby the longitudinal edges come to abut against each other. The lower figures show, as already stated, top- and bottom-end views of the bent blank.

FIGURE 7 shows, similarly, the bending of the blank shown in FIGURE 3. Here the sequence of bending is as follows: First along lines AE, then along CG, and finally along line BF. It can be seen that in both cases the blank which has, beside the trimmed outer longitudinal edges, three longitudinal markings, is bent first at one and then at the other one of the outer markings; and that the third, final bending is along the middle marking. This has the advantage that the bent portions are not in the way of the moving bending tool. When the tool is finally withdrawn, or the tube is slid lengthwise off the tool, the free edges, due to a certain inherent springiness of the material will abut against each other. They will provide a channel of a V-shaped cross-section (see FIGURES 4 and 5); the sides of the V being formed by the free edges of the metal sheet. This channel is very advantageously used for the welding operation by which the bent blank is closed to form the box-type hollow tapering beam. During the welding action the beam is preferably held immovable in suitable clamps. The ends of the beam may be closed or be left open to be covered by any subsequent constructional element.

The means by which the varying angle of bending along the beam is obtained is shown in FIGURES 8 and 9. FIGURE 8 shows the position of the lower V die tool on the square cross-section side of the beam, the upper tool edge is aligned with the center line of the V-groove. FIGURE 9 shows the position of the V-die, which has been modified, at the rectangular cross-section of the beam, the upper tool edge coming nearer to the edge of the V-die. The 90° bending angle is here divided by the plane of the knife into two unequal complimentary angles. The varying angular position of the edges of the lower V-die in relation to the edge of the upper tool is the cause by which the bending operation results in the continuously varying complementary angles formed between the knife member and the sheet metal faces at the sides of said knife member.

In FIGURES 8 and 9 the knife or edge member is designated by the numeral 10 and the die with its V-groove by the numeral 11. While in FIGURE 8, i.e. at the square end side the member 10 extends symmetrically in relation to the groove in member 11, this is not so according to FIGURE 9. This is attained by defining and fixing the position of the die 11 at the square end side by means of two blocks 12, one at each side of the member 11 which is supported on a rimmed support die holder 15, or by other means causing a displacement and fixing—in the so attained position—of the die. At the opposite end of the beam the two blocks 12 (where these are employed) are at the same side of the die 11 as shown in FIGURE 9. Thus the die member 11 extends at an angle, obliquely on its die holder, as shown clearly in FIGURE 10. The edge of member 10 is indicated in FIGURE 10 by a thick line 10.

In FIGURE 11 the left hand rectangle represents a rectangular cross-section as seen from the end of a tapered beam. A line drawn between B and D (or A and C) will divide the rectangle into two right triangles of equal size. Angles ABC and CDA of 90° each are divided by such a line into two unequal complementary angles. Similar lines drawn on different rectangular cross-sections of the beam will result in two right triangles with the dividing line giving two different unequal but complementary angles. If such a line is drawn on the square cross-section of the beam, it will result in two issoceles triangles and therefore two equal complementary 45°/45° angles. In the actual production process the upper tool of a press represents such a line dividing the beam and its ABC angle of 90° into two angles, varying along the whole length of the beam, unequal but complementary at the different rectangular cross-sections, equal and complementary at the square cross-section. This operation representing the third and last bending operation will make the extreme edges of the sheet metal blank to abut against each other and will form the tapering beam. The means by which such a varying angle of bending performed by a vertical bending operation is obtained was explained when describing the use and the position of the lower V-die in FIGURE 8 and FIGURE 9.

Incidentally, the underlying idea of the invention may be applied in the manufacture of elements which are of rectangular cross-section, though not necessarily of tapering shape. By placing the V-die in a position where the center line of the V-groove is aligned parallel to the knife member but assymmetrical in relation thereto, rectangular, non-tapering beams can be produced.

Many modifications will be within the scope of the invention. The blank can be cut starting from the straight edge AE or BF. All four sides of the beam may be tapering.

It should also be understood that the "marking" referred to above and in the following claim may consist in making marking lines across the sheet to be bent and bending the sheet along these lines. However, the marking may be provided thereby that appropriate abutments are made on the tool, the press or the die holder of the press so that the sheets can be advanced to a certain degree for making the bend.

Having now particularly described and ascertained the nature of my said invention and in what manner the same is to be performed, I declare that what I claim is:

1. A method of forming a hollow, box-type four sided tapering beam or column from sheet metal of the required thickness, marking thereon the positions of the longitudinal edges of the tapering beam to be produced, cutting, if necessary, the longitudinal edges of the blank along the outer markings, bending the blank successively along the remaining markings by means of a knife member cooperating with a V-groove die until the outer longitudinal edges of the blank abut or are closely adjacent to each other, characterised thereby that for the third bending operation the relative position of the knife member and the lower die is so adjusted that the edge of the knife member and the line representing the peak of the V-groove define between them a very small angle, and finally connecting the outer edges by welding to form one longitudinal edge of the beam.

2. The method according to claim 1, of forming a beam or column of rectangular cross-section, in which the blank is bent first along the two outer markings and the last bend is made along its middle marking.

3. The method according to claims 1 and 2, characterised in that a V-die or similar forming female die is placed in such a position that its centerline deviates from that of the upper bending tool.

4. The method according to claim 1, in which the metal is steel.

5. In a method of forming from a panel of sheet metal a hollow box-type four-sided beam or column of oblong cross-section, and which method comprising bending the panel successively about two outer lines and then about an intermediate line between the two outer lines, the bending being performed by a knife member cooperating with a V-groove die until the outer longitudinal edges of the panel are closely adjacent to one another: that improvement comprising positioning the operative edge of the knife member with respect to the apex of the V-groove so that the operative edge of the knife member is disalined with the apex of the V-groove, and finally connecting the outer longitudinal edges of the sheet to one another by welding.

6. A method as set forth in claim 5 wherein the operative edge of the knife member is uniformly off-center of the apex of the V-groove and is parallel thereto.

7. A method as set forth in claim 5 wherein the operative edge of the knife member is aparallel to the apex of the V-groove.

References Cited in the file of this patent
UNITED STATES PATENTS

| | | |
|---|---|---|
| 686,818 | Macphail | Nov. 19, 1901 |
| 742,549 | Zeh et al. | Oct. 27, 1903 |